United States Patent [19]
Motley et al.

[11] Patent Number: 4,597,089
[45] Date of Patent: Jun. 24, 1986

[54] SINGLE PULSE FAST LEARN MODEM

[75] Inventors: David M. Motley, Santa Ana, Calif.; Andrew Kameya, Medfield, Mass.

[73] Assignee: Hycom Incorporated, Irvine, Calif.

[21] Appl. No.: 512,332

[22] Filed: Jul. 11, 1983

[51] Int. Cl.[4] .............................................. H04B 3/04
[52] U.S. Cl. ........................................ 375/13; 375/15
[58] Field of Search ..................... 375/11, 12, 13, 14, 375/15, 16, 94, 95

[56] References Cited

U.S. PATENT DOCUMENTS

| | | | |
|---|---|---|---|
| 3,715,665 | 2/1973 | Chang | 375/13 |
| 3,962,637 | 6/1976 | Motley et al. | 375/15 |
| 4,320,517 | 3/1982 | Godard et al. | 375/13 |
| 4,435,825 | 3/1984 | Tomooka | 375/12 |
| 4,539,689 | 9/1985 | Chiu et al. | 375/13 |

FOREIGN PATENT DOCUMENTS

57-97236 6/1982 Japan ..................................... 375/13

Primary Examiner—Joseph A. Orsino, Jr.
Attorney, Agent, or Firm—Gordon L. Peterson

[57] ABSTRACT

A fast learn modem comprising a transmitter for generating a fast learn preamble and applying the preamble to a communication channel and a receiver for receiving the fast learn preamble from the communication channel. The fast learn preamble includes a single impulse and the timing, phase and equalization characteristics of the receiver are adjusted in response to the single impulse so that the receiver can receive and process data.

20 Claims, 4 Drawing Figures

Fig. 1

Fig. 2
TYPICAL IMPULSE AT LOW-PASS FILTER

SELECTED BAUD SAMPLES OF IMPULSE AT LOW-PASS FILTER

SINGLE PULSE FAST LEARN MODEM

BACKGROUND OF THE INVENTION

Data is often transmitted from a business machine at one location over telephone lines to a business machine at a remote location. The telephone lines characteristically introduce error to the signal being transmitted. To overcome this, the receiving station must be adaptive to the characteristics of the telephone lines. This adaptation or adjusting function is typically performed by a modem, and the modem field is now highly developed.

When it is desired to transmit data from a transmitting station to a receiving station, the transmitting station generally transmits a start-up sequence or preamble of known characteristics. In response to this preamble, the receiver at the receiving station must first confirm that the preamble is a signal rather than noise and then make the necessary adjustments so that the receiving station can properly receive and process the data signal.

It is desirable to reduce the learning time of the receiver to a minimum so that the modem can process more data in a given length of time. In a multi-point communication network comprising a master station and numerous slave stations, any reduction in the learn time is multiplied by the number of stations in the network for each poll of the network. Thus, a fast learn modem enables more efficient use of the telephone network.

One fast learn modem is disclosed in Motley et al U.S. Pat. No. 3,962,637. This modem utilizes a preamble which includes an unmodulated carrier portion, a modulated carrier portion and two impulses separated from each other and from the adjacent portions of the preamble by a null or zero energy portion. Although the modem of this patent functions very well and provides fast adaptation to the communication channel, for some applications, even faster learning is desired.

SUMMARY OF THE INVENTION

This invention provides a fast learn modem in which the timing, phase and equalization characteristics of the receiver can be adjusted in response to a single impulse of a fast learn preamble. Typically, each impulse of a preamble is separated from an adjacent impulse or other portion of the preamble by a null. Accordingly, the reduction from two impulses to one impulse eliminates not only the time required for the eliminated impulse, but also the time for one of the nulls.

A fast learn modem characteristically includes a transmitter which generates the preamble and applies it to a communication channel, such as telephone lines, and a receiver at a receiving station. The transmitted signal is in analog format, and the receiver includes an analog-to-digital converter (A/D converter), a demodulator and low-pass filter, followed by an equalizer and a data detector.

In a digitally implemented data modem receiver, the incoming signal is sampled at a sufficiently high rate to avoid aliasing (i.e., more than twice the highest frequency). This rate is also, generally, a multiple of the symbol or baud rate. The baud or symbol rate of present 4800 b/s modems is typically 1600 and for 9600 b/s modems is 2400. Therefore, typical sample frequencies for a 1600 baud modem would be 9600 Hz or 6 samples per baud and 7200 or 9600 Hz for a 2400 baud modem or 3 or 4 samples per baud.

In most digitally implemented data modems it is convenient to process the low-pass filters required for demodulating the modulated data signal at the baud rate instead of the sample rate and thus simplify the modem design and cost.

Ideally, the signal received by the receiver should be sampled by the A/D converter at certain known times. However, because the receiver is not initially synchronized in relation to the transmitted impulse, and because of the distortion introduced by the telephone lines, the A/D samples may be not taken at the ideal time. Any difference between the ideal instant at which the samples should be taken and the instant at which the samples are taken is regarded as sampling error.

Typically, to correct the sampling or timing error, the receiver adjusts the instant at which sampling occurs at the A/D converter to reduce the timing or sampling error to an acceptable magnitude. However, if the phase of the sample frequency is quickly changed appreciably, the preceding signal samples stored in the low-pass filter are no longer valid and therefore must be discarded. However, with this invention, the low-pass filter is processed at the sample rate of, typically, 9600 Hz for the reception of the impulse, and, when this is done, sufficient samples are available such that adequate coarse symbol timing can be achieved by simply selecting that set of baud samples which results in minimum timing error. This invention precludes having to change the A/D timing and the necessity of then having to discard the low-pass filter samples and transmit a second impulse, thereby appreciably lengthening the preamble.

The modem can insure that the coarse timing error is minimized by selecting that set of samples that contains the maximum squared impulse vector.

To accomplish this, the preamble, and, in particular, the impulse provided by the preamble is sampled over a predetermined interval which may extend for several bauds to provide a group of consecutive samples. The sample of the group having a predetermined vector magnitude characteristic is selected. Preferably, the predetermined vector magnitude characteristic is the maximum vector magnitude. The sample of the group having the maximum sample magnitude is selected. This selected sample is then used to provide equalizer coefficients.

More particularly, after the maximum sample value is selected, additional samples from the group are also selected, with the other samples of the group being nonselected samples. Each of the selected samples is separated from the next selected sample by at least one of the nonselected samples.

With this approach, the maximum possible baud timing error is $\frac{1}{2}N$ of a baud where N is the number of samples per baud provided by the A/D converter per baud. Accordingly, to reduce timing error, the number of samples per baud can be increased. On the other hand, increasing the number of samples per baud increases the complexity of the system. Generally, the number of samples per baud must be sufficient to reduce the coarse timing error sufficiently so that the equalizer can compensate for the remaining timing error during startup. Although two samples per baud are workable, it is preferred to have at least three samples per baud.

In actual practice to select the best timing, the maximum signal vector $(XI(n)^2 + XQ(n)^2)^{\frac{1}{2}}$, using both the real and imaginary channels is used. After best coarse timing is selected the modem can be phase corrected by inserting the arc tangent of (XQ(M)/XI(M)) into the first phase correction network, where XQ(M), and XI(M) are those signals that had the maximum vector magnitude. Those other impulse samples of the same group as the maximum signal, to be used in calculating the equalizer coefficients, must also be phase corrected.

The invention, together with additional features and advantages thereof, may best be understood by reference to the following description taken in connection with the accompanying illustrative drawings.

DESCRIPTION OF THE PREFERRED EMBODIMENT

Figure 1:
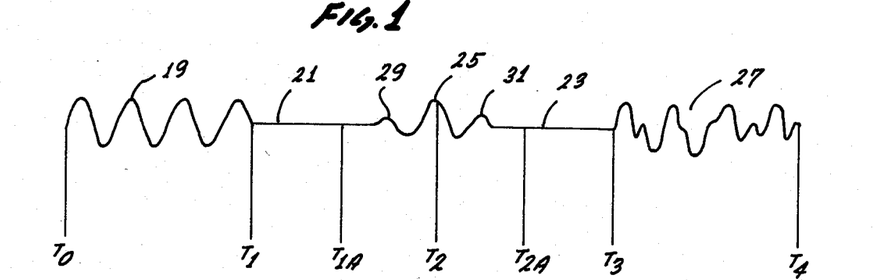
FIG. 1 is a single pulse fast learn preamble which can be used with this invention.
Figure 3:
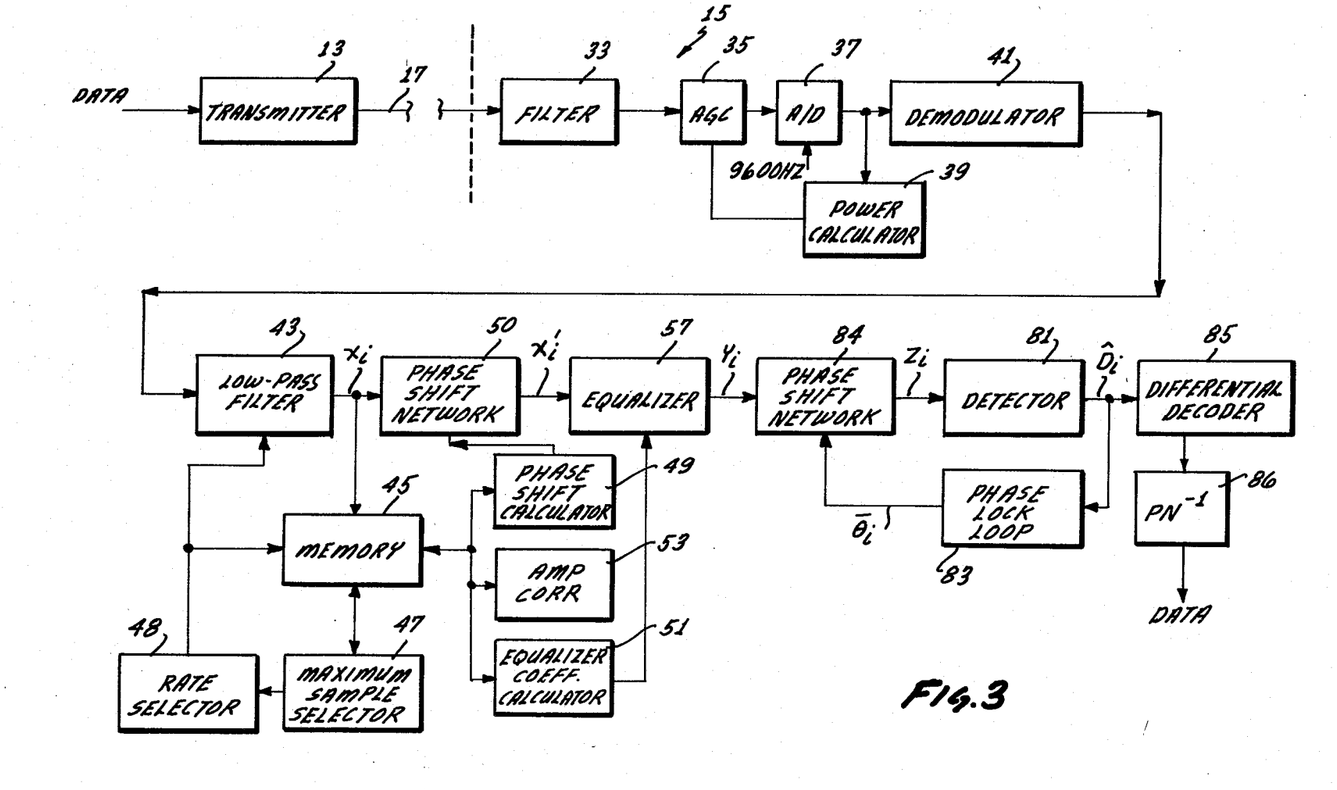
FIG. 3 is a block diagram of one form of modem constructed in accordance with the teachings of this invention.

FIG. 3 shows a modem in block diagram form which generally includes a transmitter 13 and a receiver 15 coupled to the transmitter 13 over a communication channel, such as telephone lines 17, in a well-known manner. In use, the transmitter 13, as shown in FIG. 3, may transmit data to the receiver 15, or to other receivers (not shown) which are located remotely with respect to the transmitter. Similarly, a receiver and transmitter may be associated with the transmitter 13 and receiver 15, respectively, so that the station at which the receiver 15 is located can transmit data to the station at which the transmitter 13 is located. For example, a system as shown in FIG. 1 of Motley et al U.S. Pat. No. 3,962,637 may be employed and such patent is incorporated by reference herein.

The transmitter 13 and the receiver 15 are both complex, and the transmitter 13 may be constructed in accordance with FIG. 2 of Motley et al U.S. Pat. No. 3,962,637. However, the transmitter 13 has a start-up sequence generator which provides the preamble of FIG. 1 rather than the preamble disclosed in the Motley et al patent. As shown in FIG. 1, the preamble includes a segment 19 provided for carrier detection, nulls 21 and 23, a modulated impulse 25 and a pseudorandom data sequence 27. The preamble need be provided in only one channel of the complex system. In the form of the preamble shown in FIG. 1, the carrier detect portion is an unmodulated carrier which may be, for example, a 1600 Hz carrier. The carrier detect portion 19 occurs between times $T_0$ and $T_1$, and this period may have, for example, a duration of five bauds.

The nulls 21 and 23 of the preamble are provided to separate the impulse 25 from the carrier detect portion 19 and the pseudorandom sequence 27, respectively. As shown by way of example in FIG. 1, the impulse 25 has some lead-in intersymbol interference 29 and trailing intersymbol interference 31. During the nulls 21 and 23, the transmitter 13 sends zero energy but of course, intersymbol interference and noise may exist during these periods in the preamble received by the receiver 15.

As explained more fully hereinbelow, the single impulse 25 is provided for timing, phase and equalization adjustment of the receiver 15. The pseudorandom sequence 27 is a randomized data sequence which is provided for final phase correction and synchronization of the differential decoder and the derandomizer. The use of a pseudorandom sequence, such as the pseudorandom sequence 27, for the final portion of a start-up preamble to accomplish these purposes is conventional.

The receiver 15 receives the preamble from the telephone lines 17. The receiver 15 includes an analog filter 33 for selecting the desired passband and an automatic gain control (AGC) 35 which provides the desired signal level in accordance with known techniques. Next the analog signal is applied to an A/D converter 37 which includes a sampler to sample and digitize the analog signal at a rate, such as 9600 Hz corresponding to some multiple of the symbol or baud rate of the transmitter 13. The converter 37 is controlled in a conventional manner by a stream of clock pulses. The converter 37 responds to each of the pulses by taking a single sample of the analog signal and by expressing the sign and amplitude of the sample as a digital number. In typical prior art systems, the interval between clock pulses, i.e., sampling phase, can be adjusted to adjust the times at which the converter takes its samples. However, this invention eliminates the need for this added complexity in that the sampling phase need not be adjusted during start-up, although it may be during normal operation of the modem.

A power calculator 39 is coupled to the output of the converter 37 for providing carrier detection and AGC signal level calculations utilizing sequential groups of three samples of the carrier detect portion 19 from the A/D converter 37 as follows:

$$S_K = \sum_{i=0}^{2} W_i^2, \ S_{K+1} = \sum_{i=3}^{5} W_i^2, \text{ etc.}$$

where $W_i$ is the ith sample of the A/D converter 37 operating at 9600 samples/sec.

If the carrier detect portion 19 of the preamble is a sinusoidal 1600 Hz carrier, the $S_K$ measurements made at 9600 samples per second are independent of the phase of the carrier. For carrier detection, two sequential measurements, i.e., $S_K$ and $S_{K+1}$, should both be greater than some preset threshold. Adjustment of the AGC 35 takes place following carrier detection by making sequential $S_K$ measurements and inserting the proper attenuators until a proper signal amplitude is received. The carrier detection and AGC adjustment functions are conventional and are a part of conventional start-up sequences for a modem as illustrated by way of example in the Motley et al patent referred to above. Carrier detection and AGC adjustment can typically be achieved in four or five bauds, and so the time between $T_0$ and $T_1$ in FIG. 1 may be, for example, five bauds.

A complex demodulator 41 is coupled to the output of the converter 37. The demodulator 41 noncoherently demodulates the digital signal from the converter 37 and provides signal components in an I channel and a Q channel. Demodulation can be accomplished in accordance with known techniques, such as those shown and described in Motley et al U.S. Pat. No. 3,962,637.

Following carrier detection and AGC adjustment, the operation of a complex digital low-pass filter 43 is initiated and this may occur, for example, at time $T_{1A}$. The demodulated signal is introduced into the filter 43 which selects the desired baseband signal from the demodulated signal. The filter 43 is conventional and may be of the type described in the Motley et al patent referred to above. The filter 43 is designed with a corresponding complex filter (not shown) in the transmitter 13 to provide an ideal impulse response. The filter 43 in conjunction with the transmit filter may provide raised cosine signaling, and the signal components at the output of the complex filter 43 are designated XI and XQ in the respective I and Q channels.

The filter 43 receives demodulated signal samples at the sampling rate. It is conventional practice for low-pass filters, such as the filter 43, to provide signal samples at its output at the baud rate during start-up and during normal operation of the modem. This invention departs from that conventional practice in allowing the filter 43 to operate or provide signal samples at its output at the sampling rate of the converter 37 during at least a portion of the time that the preamble of FIG. 1 is being received. Thus, for a sampling rate of 9600 samples per second and a baud rate of 2400, the filter provides 9600 samples per second at its output or 4 samples per baud.

The filtered signal samples, XI and XQ of the portion of the signal from $T_{1A}$ to $T_{2A}$ are stored in a complex memory 45 at the output of the filter 43. The memory 45 stores a large enough number of consecutive samples from the filter 43 to assure that the impulse 25 is adequately sampled. For example, 40 samples or 10 symbols of information may be stored in the memory 45, although these numbers are not critical. By way of example, the complex memory 45 may comprise buffer registers or random access memories (RAMs) of sufficient length to store the necessary number of samples.

As each sample is stored in the memory 45, a maximum sample selector 47 determines the squared vector magnitude of that sample. As is well known, the squared vector magnitude of a single sample in a complex system is determined by $$(XI_i)^2 + (XQ_i)^2 = \text{squared vector magnitude.}$$

Of the squared vector magnitudes calculated by the selector 47, the largest squared vector magnitude is retained as a threshold level so that the selector 47, after determining the squared vector magnitudes of all of the samples stored in the memory 45, has selected the maximum square vector magnitude. Squared vector magnitudes are, of course, commonly calculated in modems, and the maximum squared vector magnitude can be easily ascertained in accordance with known techniques.

However, before selecting the sample having the maximum squared vector magnitude, it is necessary to insure that an impulse has been detected. This is also done by the maximum sample selector 47. Specifically, learning is allowed to proceed only if the squared vector magnitude of one of the signal samples in the memory 45 exceeds a predetermined threshold.

Figure 2:
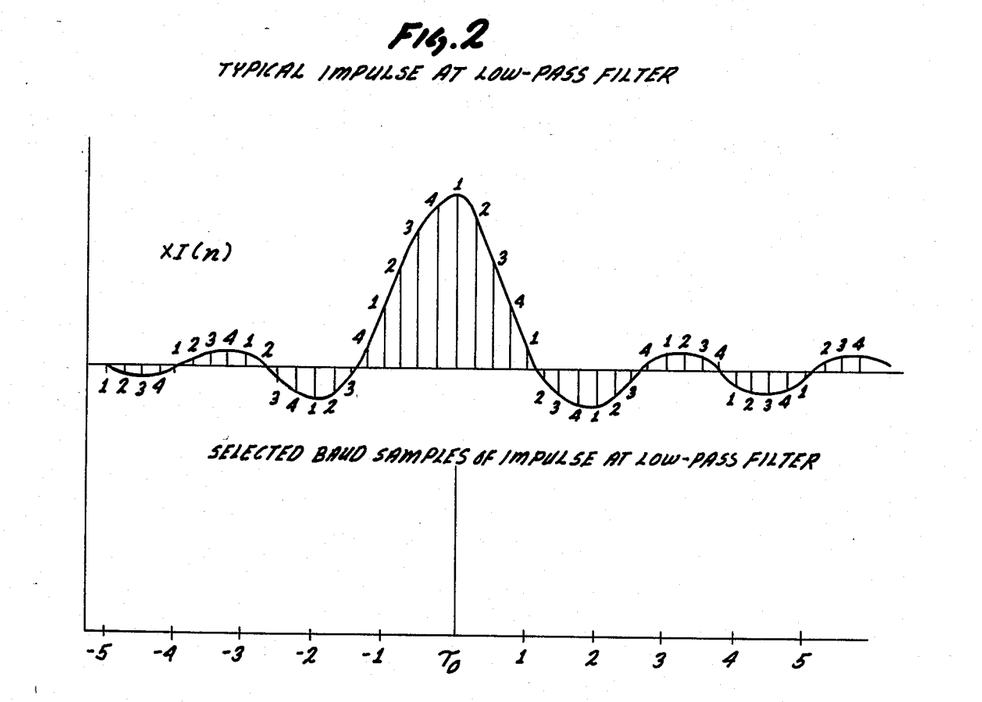
FIG. 2 shows a typical impulse of a 2400 baud modem at the output of the low-pass filter.

The samples which provide the maximum squared vector magnitude in the I and Q channels are designated $HI_M$ and $HQ_M$. The sample having the maximum squared vector magnitude becomes the reference sample for symbol or baud timing and its location is designated $\tau_O$ (FIG. 2). With the location $HI_M$ and $HQ_M$ at $\tau_O$, only those other samples located at $\tau_O$ plus or minus $N_\tau$ need to be retained in the memory, where $\tau$, in this example, is 1/2400 seconds and N is, in this example, approximately 5. In other words, in this example, every fourth sample measured from the maximum value sample is retained in the memory 45, and the remaining non-selected samples need not be further retained.

This is more easily explained with reference to FIG. 2 This figure depicts a typical impulse of a 2400 baud modem at the output of the low-pass filter sampled at a 9600 Hz rate. As shown by the lower abscissa in FIG. 2, the impulse response extends over plus or minus 5 bauds of the signal. For simplicity, only the real channel is shown. At the 9600 Hz rate it is easy to pick the proper timing by simply selecting that set of samples (labeled here 1, 2, 3 or 4) that has as its member that signal with the maximum value. Here it is seen to be that set of samples labeled 1. After timing selection has been made only those signals labeled 1 need to be processed.

The selection of the sample having the maximum squared vector magnitude establishes baud timing for the receiver 15, and it is, therefore, possible to begin processing the low-pass filter 43 at the baud rate. The low-pass filter 43 can, of course, provide signal samples at its output at a multiple of the baud rate, and it is a sample matter to, in effect, shift the low-pass filter from supplying signal samples at the sample rate to supplying signal samples at just the baud rate. As shown in FIG. 3, the maximum sample selector 47 provides a rate selector 48 with the number of the sample which has been identified as the sample having the maximum vector magnitude. The rate selector 48 performs the function of reducing the processing rate of the low-pass filter 43 from the sampling rate to the baud rate with the coarse timing phase having been identified as the maximum sample selected by the sample selector 47. The rate selector 48 responds to the maximum sample selector 47 by selecting the identified sample and ignoring the non-selected sample. Thus, the rate selector 48 performs a commutator type function. The rate selector 48 monitors the sample number at the output of the filter 43 and permits the filter 43 to operate at the sampling rate until the difference between the sample at the output of the filter 43 and the number of the selected sample is an even multiple of the separation between consecutive selected samples, i.e., 4, in the illustrative embodiment being described. This provides the low-pass filter 43 with baud timing coincident with the baud timing established by the memory 45 and the maximum sample selector 47. Thereafter, the filter 43 can provide signal samples at its output at the baud rate.

After baud timing has been established, the phase error can be calculated in accordance with the following:

$$\phi = \text{TAN}^{-1} - \left( \frac{HQ_M}{HI_M} \right)$$

To calculate phase error, the maximum magnitude samples $HI_M$ and $HQ_M$ are applied to a phase shift calculator 49 which determines phase error in accordance with the above equation. Following the determination of phase error, the phase shift calculator 49 also corrects the phase error of the selected samples in accordance with the following equations:

$$HI_l' = HI_l \cos \phi - HQ_l \sin \phi$$

$$HQ_l' = HQ_l \cos \phi + HI_l \sin \phi$$

where $HI_l$ and $HQ_l$ are the impulse sample values located at $\tau_O \pm N\tau$ where typically N is 5. The phase corrected selected samples are then returned to the memory 45, and the phase error $\phi$ also is applied to a phase shift network 50 so that subsequent signals being processed by the modem will be also phase corrected. This is done in accordance with the following:

$$XI_i' = XI_i \cos \phi - XQ_i \sin \phi$$

$$XQ_i' = XQ_i \cos \phi + XI_i \sin \phi$$

where $XI_i'$ and $XQ_i'$ are the output of the phase shift network 50 in the I and Q channels, respectively, and $XI_i$ and $XQ_i$ are the inputs to the phase shift network 50 in the I and Q channels, respectively.

Following phase correction, the phase selected samples are amplitude corrected by an amplitude corrector 53 in accordance with the following:

$$hI_{la}' = \frac{HI_l'}{HI_M'}$$

$$hQ_{la}' = \frac{HQ_l'}{HI_M'}$$

where $hI_{la}'$ and $hQ_{la}'$ are the amplitude corrected samples following phase correction, $HI_l'$ and $HQ_l'$ are the phase corrected 2400 baud impulse samples, and where $HI_M'$ is the phase corrected reference sample at $\tau_O$. The amplitude and phase corrected selected samples are again returned to the memory 45 following amplitude correction.

The baud timing as established by the selected samples from the memory 45 contains some timing error, and in this example, the maximum possible timing error is $\frac{1}{2}N$ where $N=4$ or $\frac{1}{8}$ of a baud. This timing error is small enough so that it can be compensated for with equalizer adjustments, i.e., by providing suitable equalizer coefficients to compensate for this timing error.

The object of any equalizer is to reduce the intersymbol interference so as to enable the receiver to make reliable data signal decisions. The selected signal samples include samples of the lead-in and trailing intersymbol interference. Accordingly, equalizer coefficients for reducing intersymbol interference can be calculated using the selected phase and amplitude corrected signal samples.

The equalizer coefficients are calculated in an equalizer coefficient calculator 51 which may be a high speed processor. Equalization is obtained in an equalizer 57 which may comprise both a transversal equalizer for minimizing the lead-in intersymbol interference and a decision feedback equalizer for cancelling the trailing intersymbol interference.

Figure 4:
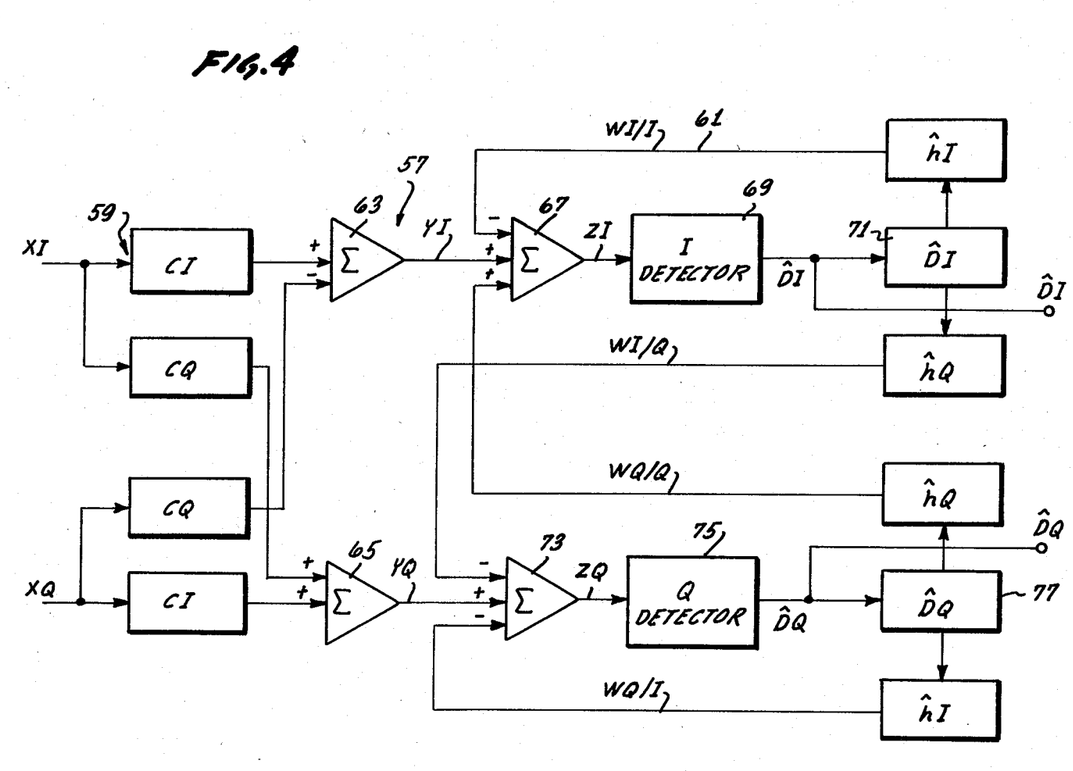
FIG. 4 is a block diagram showing one preferred form of equalizer.

As shown in FIG. 4, the equalizer 57 includes a transversal equalizer 59 and a decision feedback equalizer 61. The transversal equalizer 59 is conventional and comprises equalizer taps in the I and Q channel designed CI and CQ, respectively, and adders 63 and 65. The signal samples in the I and Q channels XI and XQ are convolved with the equalizer taps CI and CQ as shown, with the resulting values applied to the adders 63 and 65 as shown in the I and Q channels.

The decision feedback equalizer 61 includes an adder 67, a detector 69 and a register 71 in the I channel, and an adder 73, detector 75 and register 77 in the Q channel. The decision feedback equalizer 61 also includes taps hI and hQ. The taps hI and hQ are estimates of the real and imaginary trailing intersymbol interference and the signal WI/I is formed by convolving the stored previously detected data symbols DI with the taps hI. The signal WI/Q is formed by convolving the same data symbols DI, with the taps hQ. Also, signals WQ/I and WQ/Q are formed by convolving the previously detected data symbols DQ with the taps hI and hQ, respectively. The adder 67 algebraically sums the signals WI/I and WQ/Q with the output of the adder 63. Similarly, the adder 73 sums signals WQ/I and WI/Q with the output of the adder 65. The detectors 69 and 75 then detect the data in the outputs from the adders 67 and 73, respectively, and provide detected data signals DI and DQ, respectively.

Now, a more explicit mathematical explanation of how the impulse response of the channel as stored in memory can be used to calculate the equalizer tap values is discussed.

If the overall impulse response in the real and imaginary, or I and Q channels, is $hI_l$ and $hQ_l$, respectively, where $l$ has integer values up to $\pm N$, where N might be typically 5, then the I channel low-pass filter output can be represented by $$XI_j = DI_j * hI_l - DQ_j * hQ_l$$

and the Q channel low-pass filter output is $$XQ_j = DQ_j * hI_l + DI_j * hQ_l$$

where $DI_j$ and $DQ_j$ represent the I and Q channel data symbols, respectively, and (*) represents the convolution operation, i.e., $$DI_j * hI_l = \sum_{l=-\infty}^{\infty} DI_l hI_{j-l}$$

If $XI_j$ and $XQ_j$ are the baud sample values of the received signal appearing at the outputs of the low-pass filter 43 in the receiver 15 then $$YI_j = XI_j * CI_K - XQ_j * CQ_K$$

$$YQ_j = XQ_j * CI_K + XI_j * CQ_K$$

where $CI_K$ and $CQ_K$ are the real and imaginary equalizer tap values, respectively, and K has integer values and represents the location of a particular tap. If we assume, as an example, that the intersymbol interference of the overall system can be limited to the following terms $$hI_l \rightarrow hI_{-2}, hI_{-1}, hI_0, hI_1, hI_2$$

$$hQ_l \rightarrow hQ_{-2}, hQ_{-1}, hQ_0, hQ_1, hQ_2$$

and that a three tap transversal filter is used to minimize the lead-in intersymbol interference, $$CI_K \rightarrow CI_{-2}, CI_{-1}, CI_0$$

$$CQ_K \rightarrow CQ_{-2}, CQ_{-1}, CQ_0$$

then it is straightforward to show that simplified solutions for the transversal equalizer that minimize the majority of the intersymbol interference are as follows:

$$CI_{-1} = -hI_{-1} - hI_1 CI_{-2} - hQ_1 CQ_{-2}$$

$$CQ_{-1} = hQ_{-1} + hQ_1 CI_{-2} - hI_1 CQ_{-2}$$

$$CI_{-2} = -hI_{-2} - hI_{-1} CI_{-1} - hQ_{-1} CQ_{-1}$$

$$CQ_{-2} = hQ_{-2} + hQ_{-1} CI_{-1} - hI_{-1} CQ_{-2}$$

and the simplified solutions for a decision feedback equalizer are:

$$hI_1 = hI_1 - hI_2 hI_{-1} + hQ_2 hQ_{-1}$$

$$hQ_1 = -hQ_1 + hQ_2 hI_{-1} + hI_2 hQ_{-1}$$

$$hI_2 = hI_2$$

$$hQ_2 = -hQ_2$$

where it is assumed that $CI_0 = 1.0$ and $CQ_0 = 0$. Thus it is possible to easily calculate an approximate solution for all the equalizer tap values with the measured sample values of the intersymbol interference.

Following the equalizer is another phase shift network 84 followed by the data detector 81. It is typically necessary to provide a phase lock loop 83 and associated phase shift network 84 to compensate for phase errors incurred following reception of the preamble.

Referring to FIG. 3 the output of the phase shift network 84, $Z_i$ may be expressed as a function of its input $Y_i$ and the output of the phase lock loop as follows:

$$ZI_i = YI_i \cos \theta_i - YQ_i \sin \theta_i$$

$$ZQ_i = YQ_i \cos \theta_i + YI_i \sin \theta_i$$

where $YI_i$ and $YQ_i$ are equalized signals in the I and Q channels, respectively, and $ZI_i$ and $ZQ_i$ are the phase corrected and equalized output signals in the I and Q channels, respectively.

It is assumed that $\bar{\theta}_i$ is averaged value of $\theta_i$. For phase modulated modems $\theta_i$ may be calculated by the following equation:

$$\theta_i = \text{TAN}^{-1}(ZI_i DQ_i - ZQ_i DI_i)$$

where $ZI_i$ and $ZQ_i$ are the equalized detector input signals in the I and Q channels, respectively, and $DI_i$ and $DQ_i$ are detected data symbols in the I and Q channels, respectively, and are the estimated values of the actual transmitted data symbols $DI_i$ and $DQ_i$. Both the detector 81 and the phase lock loop can be of the type commonly employed in modems.

With the phase, timing and equalization characteristics of the receiver being fully adjusted in response to the single impulse 25, the receiver is now prepared to receive the pseudorandom data sequence 27. This sequence is typically required to synchronize the differential decoder 85 and derandomizer 86 before customer data is received. This is the common final step in the start-up procedure. Because the transmitted pseudorandom data sequence 27 is known, and the receiver through detection of the impulse has accurate symbol timing, the receiver may use the actual transmitted data symbols DI and DQ for faster learning instead of DI and DQ for reception of the segment 27 of the preamble. However, after segment 27 and before customer data, the receiver must switch back to using the detected data symbols.

Although an exemplary embodiment of the invention has been shown and described, many changes, modifications and substitutions may be made by one having ordinary skill in the art without necessarily departing from the spirit and scope of this invention.

We claim:

1. A modem adapted to receive an incoming signal including a preamble from a communication channel and to at least partially adjust to the communication channel in response to the preamble, said modem comprising:
   means for sampling the preamble to provide signal samples;
   a complex filter for filtering the signal samples;
   means for selecting the sample from a group of samples from the filter which has a predetermined vector magnitude characteristic;
   means responsive to said sample having said predetermined vector magnitude characteristic for establishing baud timing for the modem; and
   rate selector means responsive to the sample having said predetermined vector magnitude characteristic so that no more than every other sample received by the filter from the sampling means is provided at the filter output during normal operation.

2. A modem as defined in claim 1 wherein said predetermined vector magnitude is the maximum vector magnitude of all of the samples in said group.

3. A modem as defined in claim 1 wherein said sampling means samples the preamble at a sampling rate and said complex filter provides the signal samples at the output of the complex filter at substantially said sampling rate at least during a portion of the time that signal samples of the preamble are being processed by the filter.

4. A modem as defined in claim 1 including coefficient calculator means responsive to at least said sample having said predetermined vector magnitude characteristic for providing equalizer coefficients and an equalizer responsive to said equalizer coefficients.

5. A modem as defined in claim 1 wherein said sampling means samples the signal at the sampling rate to provide a consecutive group of signal samples with the signal samples from said consecutive group corresponding, respectively, to the samples of said group of samples from the filter.

6. A modem as defined in claim 1 wherein during the sampling of the preamble, the sampling phase of the sampling means is fixed and does not vary.

7. A modem as defined in claim 1 wherein said selecting means includes storage means for storing each of the samples from the filter and means for selecting said sample having said predetermined vector magnitude characteristic from the samples stored by the storage means.

8. A modem adapted to receive an incoming signal including a preamble from a communication channel and to at least partially adjust to the communication channel in response to the preamble, said modem comprising:
   means for sampling the preamble at a sampling rate to provide signal samples;
   a complex filter for filtering the signal samples, said complex filter being capable of providing filtered signal samples at its output at the sampling rate or at a reduced rate which is less than said sampling rate, said filter initially providing the filtered signal samples at the sampling rate;

means for selecting the sample from a group of samples at the output of the filter provided at said sampling rate which has a predetermined vector magnitude characteristic; and rate selector means responsive to said sample having said predetermined vector magnitude characteristic for reducing the output of said filter to said reduced rate.

9. A modem as defined in claim 8 wherein the operation of said filter at said reduced rate provides no more than every other sample received by the filter at the filter output.

10. A modem as defined in claim 8 including coefficient calculator means responsive to at least said sample having said predetermined vector magnitude characteristic for providing equalizer coefficients and an equalizer responsive to said equalizer coefficients.

11. A method of at least partially adjusting a receiver to a communication channel comprising:

receiving an incoming signal including a preamble from a communication channel;

sampling the preamble at a sampling rate to provide signal samples;

filtering the signal samples in a complex filter to provide filtered signal samples at the output of the filter at the sampling rate;

selecting the sample from a group of samples from the filter which has a predetermined vector magnitude characteristic; and reducing the rate at which the filtered signal samples are provided at the filter output subsequent to said step of selecting to a rate which is no more than one-half of the sampling rate.

12. A modem adapted to receive an incoming signal including a preamble from a communication channel and to at least partially adjust to the communication channel in response to the preamble, said modem comprising:

means for sampling the preamble to provide signal samples;

a complex filter for filtering the signal samples;

means for selecting the sample from a group of samples from the filter which has a predetermined vector magnitude characteristic;

coefficient calculator means responsive to said sample having said predetermined vector magnitude characteristic for providing equalizer coefficients;

an equalizer responsive to said equalizer coefficients; and said selecting means including means for selecting additional samples with said additional samples and said maximum value sample being selected samples and the other samples of said group being nonselected samples, each of said selected samples being separated from the next selected sample by at least one of the nonselected samples, and said coefficient calculator means is responsive to said selected samples for providing said equalizer coefficients.

13. A modem as defined in claim 12 wherein there are at least two of said nonselected samples between each of said selected samples.

14. A modem as defined in claim 12 including means for phase correcting said selected samples and means for amplitude correcting said selected samples and said coefficient calculator means is responsive to the phase and amplitude corrected selected samples for providing said equalizer coefficients.

15. A fast learn modem comprising:

means for generating a fast learn preamble which includes a single pulse and which can be transmitted over a communication channel;

a receiver for receiving the fast learn preamble from the communication channel;

said receiver including means responsive to said single pulse for substantially adjusting the timing, phase and equalization characteristics of the receiver so that the receiver can receive and process data; and said receiver including sampling means for sampling the preamble to provide samples of the preamble in a digital format and said adjusting means adjusts the timing characteristic of the receiver without adjusting the sampling phase of the sampling means.

16. A modem as defined in claim 15 wherein said generating means provides said preamble with a detection portion separated from the single pulse by a null portion and said receiver includes means responsive to the detection portion for identifying the preamble.

17. A modem as defined in claim 15 wherein said sampling means samples the preamble to provide samples of the preamble in a digital format and said receiver includes means for selecting the sample from a group of said samples which has the maximum vector magnitude, and said adjusting means includes means responsive to said maximum magnitude sample for substantially adjusting at least one of said characteristics of said receiver.

18. A modem as defined in claim 17 wherein said generating means provides said preamble with an unmodulated carrier portion separated from the single pulse by a first null portion and a data portion separated from the single pulse by a second null portion, said receiver includes an automatic gain control and means responsive to the carrier portion for identifying the preamble and for adjusting the level of the automatic gain control, and said adjusting means is responsive to said maximum sample value for substantially adjusting the timing, phase and equalization characteristics of the receiver.

19. A fast learn modem adapted to receive a preamble which includes a single pulse to adjust characteristics of the modem, said modem comprising:

means for sampling the single pulse of the preamble at a sample rate to provide signal samples of the single pulse;

means for selecting certain of said samples to provide a plurality of selected samples; and means responsive to said selected samples for establishing baud timing for the modem without changing the sampling phase of the sampling means.

20. A modem as defined in claim 19 including means responsive to said selected samples for establishing phase and equalization characteristics for the modem.

* * * * *

UNITED STATES PATENT OFFICE
CERTIFICATE OF CORRECTION

Page 1 of 2

Patent No. 4,597,089          Dated Jun. 24, 1986

Inventor(s) David M. Motley and Andrew Kameya

It is certified that error appears in the above-identified patent and that said Letters Patent are hereby corrected as shown below:

Column 7, line 66 change both instances of "hI" and "hQ" to -- $\hat{hI}$ -- and -- $\hat{hQ}$ --.

Column 8, line 1 change "DI" to -- $\hat{DI}$ --.

Column 8, line 1 change "hI" to -- $\hat{hI}$ --.

Column 8, line 3 change "DI" to -- $\hat{DI}$ --.

Column 8, line 3 change "hQ" to -- $\hat{hQ}$ --.

Column 8, line 5 change "DQ" to -- $\hat{DQ}$ --.

Column 8, line 5 change "hI" to -- $\hat{hI}$ --.

Column 8, line 5 change "hQ" to -- $\hat{hQ}$ --.

Column 8, line 12 change "DI" to -- $\hat{DI}$ --.

Column 8, line 12 change "DQ" to -- $\hat{DQ}$ --.

Column 9, line 9 the first occurrence of "$hI_1$" change to -- $\hat{hI}_1$ --.

Column 9, line 11 the first occurrence of "$hQ_1$" change to -- $\hat{hQ}_1$ --.

Column 9, line 13 the first occurrence of "$hI_2$" change to -- $\hat{hI}_2$ --.

Column 9, line 15 the first occurrence of "$hQ_2$" change to -- $\hat{hQ}_2$ --.

Column 9, line 31 change both occurrences of "$\theta_i$" to -- $\bar{\theta}_i$ --.

Column 9, line 33 change both occurrences of "$\theta_i$" to -- $\bar{\theta}_i$ --.

Column 9, line 39 change the first occurrence of "$\theta_i$" to -- $\bar{\theta}_i$ --.

UNITED STATES PATENT OFFICE
CERTIFICATE OF CORRECTION

Patent No. 4,597,089  Dated Jun. 24, 1986

Inventor(s) David M. Motley and Andrew Kameya

It is certified that error appears in the above-identified patent and that said Letters Patent are hereby corrected as shown below:

Column 9, line 43 change "$\theta_i = TAN^{-1}(ZI_i DQ_i - ZQ_i DI_i)$" to -- $\theta_i = TAN^{-1}(ZI_i \widehat{DQ}_i - ZQ_i \widehat{DI}_i)$ --.

Column 9, line 46 change "$DI_i$" to -- $\widehat{DI}_i$ --.

Column 9, line 47 change "$DQ_i$" to -- $\widehat{DQ}_i$ --.

Column 9, line 63 change the second occurrence of "DI" to -- $\widehat{DI}$ --.

Column 9, line 64 change "DQ" to -- $\widehat{DQ}$ --.

Signed and Sealed this

Twenty-first Day of October, 1986

[SEAL]

Attest:

DONALD J. QUIGG

Attesting Officer  Commissioner of Patents and Trademarks